(12) United States Patent
Marquardt et al.

(10) Patent No.: US 10,499,249 B1
(45) Date of Patent: Dec. 3, 2019

(54) DATA LINK LAYER TRUST SIGNALING IN COMMUNICATION NETWORK

(71) Applicant: Sprint Communications Company L.P., Overland Park, KS (US)

(72) Inventors: Ronald R. Marquardt, Woodinville, WA (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 102 days.

(21) Appl. No.: 15/646,842

(22) Filed: Jul. 11, 2017

(51) Int. Cl.
*H04W 12/10* (2009.01)
*H04L 29/06* (2006.01)

(52) U.S. Cl.
CPC ......... *H04W 12/10* (2013.01); *H04L 63/0428* (2013.01); *H04L 63/162* (2013.01); *H04L 63/1433* (2013.01)

(58) Field of Classification Search
CPC .. H04W 12/10; H04L 63/0428; H04L 63/162; H04L 63/1433
See application file for complete search history.

(56) References Cited

U.S. PATENT DOCUMENTS

| | | | |
|---|---|---|---|
| 5,303,378 A | 4/1994 | Cohen | |
| 5,321,735 A | 6/1994 | Breeden et al. | |
| 5,764,889 A | 6/1998 | Ault et al. | |
| 5,796,952 A | 8/1998 | Davis et al. | |
| 5,825,876 A | 10/1998 | Peterson, Jr. | |
| 6,131,024 A | 10/2000 | Boltz | |
| 6,177,860 B1 | 1/2001 | Cromer et al. | |
| 6,219,712 B1 | 4/2001 | Mann et al. | |
| 6,222,463 B1 | 4/2001 | Rai | |
| 6,363,150 B1 | 3/2002 | Bhagavath et al. | |
| 6,389,403 B1 | 5/2002 | Dorak, Jr. | |
| 6,434,561 B1 | 8/2002 | Durst, Jr. et al. | |
| 6,477,180 B1 | 11/2002 | Aggarwal et al. | |
| 6,507,869 B1 | 1/2003 | Franke et al. | |
| 6,507,904 B1 | 1/2003 | Ellison et al. | |
| 6,614,893 B1 | 9/2003 | Paiz | |
| 6,651,171 B1 | 11/2003 | England et al. | |

(Continued)

FOREIGN PATENT DOCUMENTS

| EP | 1933252 A1 | 6/2008 |
|---|---|---|
| GB | 2456754 A | 7/2009 |

(Continued)

OTHER PUBLICATIONS

European Examination Report dated Mar. 3, 2016, EPC Application Serial No. 138229745, filed on Jan. 8, 2015.

(Continued)

*Primary Examiner* — Meng Li

(57) ABSTRACT

An apparatus comprising a network communication interface to communicatively couple the apparatus to a network, a processor coupled to the network communication interface, and a memory coupled to the processor. The processor is configured to execute instructions to cause the apparatus to determine an indicator of a trusted nature of data for transmission through the network, write the data to a frame of a data stream, write the indicator to an inter-packet gap of the data stream, and transmit the data stream to the network via the network communication interface.

20 Claims, 4 Drawing Sheets

(56) References Cited

U.S. PATENT DOCUMENTS

| | | |
|---|---|---|
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,023,979 B1 | 4/2006 | Wu et al. |
| 7,043,241 B1 | 5/2006 | Sladek et al. |
| 7,069,234 B1 | 6/2006 | Cornelius et al. |
| 7,127,541 B2 | 10/2006 | Govindarajulu et al. |
| 7,366,806 B2 | 4/2008 | Milenkovic et al. |
| 7,386,275 B2 | 6/2008 | Pirzada et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,716,720 B1 | 5/2010 | Marek et al. |
| 7,761,558 B1 | 7/2010 | Jindal et al. |
| 7,849,309 B1 | 12/2010 | Brown |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,155,642 B2 | 4/2012 | Russell |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 | 9/2012 | Mikurak |
| 8,295,811 B1 | 10/2012 | Gailloux et al. |
| 8,298,295 B2 | 10/2012 | Aissi et al. |
| 8,316,237 B1 | 11/2012 | Felsher et al. |
| 8,332,895 B2 | 12/2012 | Nathan et al. |
| 8,332,953 B2 | 12/2012 | Lemieux et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,442,588 B2 | 5/2013 | Sims et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,498,572 B1 | 7/2013 | Schooley et al. |
| 8,504,097 B1 | 8/2013 | Cope et al. |
| 8,542,833 B2 | 9/2013 | Devol et al. |
| 8,566,183 B1 | 10/2013 | Bonar et al. |
| 8,588,749 B1 | 11/2013 | Sadhvani et al. |
| 8,590,012 B2 | 11/2013 | Roy et al. |
| 8,631,247 B2 | 1/2014 | OLoughlin et al. |
| 8,632,000 B2 | 1/2014 | Laracey |
| 8,649,770 B1 | 2/2014 | Cope et al. |
| 8,650,492 B1 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,699,998 B2 | 4/2014 | Sprigg et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia Martin et al. |
| 8,811,971 B2 | 8/2014 | Corda et al. |
| 8,826,015 B2 | 9/2014 | Lakshminarayanan et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,868,898 B1 | 10/2014 | Van Hoof |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,177,157 B2 | 11/2015 | Binder |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2 | 2/2016 | McCann et al. |
| 9,268,959 B2 | 2/2016 | Paczkowski et al. |
| 9,282,898 B2 | 3/2016 | McRoberts et al. |
| 9,324,016 B1 | 4/2016 | Cordes et al. |
| 9,374,363 B1 | 6/2016 | Paczkowski et al. |
| 9,384,498 B1 | 7/2016 | Bertz et al. |
| 9,443,088 B1 | 9/2016 | Bye et al. |
| 9,454,723 B1 | 9/2016 | Cordes et al. |
| 9,473,945 B1 | 10/2016 | Marquardt et al. |
| 9,560,519 B1 | 1/2017 | McCracken, Jr. et al. |
| 9,613,208 B1 | 4/2017 | Paczkowski et al. |
| 9,712,999 B1 | 7/2017 | Cordes et al. |
| 9,779,232 B1 | 10/2017 | Paczkowski et al. |
| 9,811,672 B2 | 11/2017 | Bye et al. |
| 9,817,992 B1 | 11/2017 | Paczkowski et al. |
| 9,819,679 B1 | 11/2017 | Bertz et al. |
| 9,838,392 B2 | 12/2017 | Sainio et al. |
| 9,838,868 B1 | 12/2017 | Nelson et al. |
| 9,838,869 B1 | 12/2017 | Bye et al. |
| 9,906,958 B2 | 2/2018 | Katzer et al. |
| 9,949,304 B1 | 4/2018 | McCracken et al. |
| 10,154,019 B2 | 12/2018 | McRoberts et al. |
| 10,282,719 B1 | 5/2019 | Paczkowski et al. |
| 10,311,246 B1 | 6/2019 | Paczkowski et al. |
| 2001/0041591 A1 | 11/2001 | Carroll |
| 2002/0002468 A1 | 1/2002 | Spagna et al. |
| 2002/0007456 A1 | 1/2002 | Peinado et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1 | 11/2002 | Mualem et al. |
| 2002/0174344 A1 | 11/2002 | Ting |
| 2002/0181503 A1 | 12/2002 | Montgomery |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0092435 A1 | 5/2003 | Boivin |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0182347 A1 | 9/2003 | Dehlinger |
| 2003/0216143 A1 | 11/2003 | Roese et al. |
| 2003/0229514 A2 | 12/2003 | Brown |

(56) References Cited

U.S. PATENT DOCUMENTS

| | | |
|---|---|---|
| 2003/0237002 A1 | 12/2003 | Oishi et al. |
| 2004/0036572 A1 | 2/2004 | Forster |
| 2004/0043788 A1 | 3/2004 | Mittal |
| 2004/0064351 A1 | 4/2004 | Mikurak |
| 2004/0093274 A1 | 5/2004 | Vanska et al. |
| 2004/0137890 A1 | 7/2004 | Kalke |
| 2004/0158840 A1 | 8/2004 | Rothman et al. |
| 2004/0202319 A1 | 10/2004 | Hussain et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0030898 A1* | 2/2005 | Furlong ............... H04L 41/00 370/236 |
| 2005/0044375 A1 | 2/2005 | Paatero et al. |
| 2005/0045719 A1 | 3/2005 | Yang |
| 2005/0052994 A1 | 3/2005 | Lee |
| 2005/0091505 A1 | 4/2005 | Riley et al. |
| 2005/0107068 A1 | 5/2005 | Smith et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0145688 A1 | 7/2005 | Milenkovic et al. |
| 2005/0153741 A1 | 7/2005 | Chen et al. |
| 2005/0164680 A1 | 7/2005 | Gould |
| 2005/0181796 A1 | 8/2005 | Kumar et al. |
| 2005/0200478 A1 | 9/2005 | Koch et al. |
| 2005/0226468 A1 | 10/2005 | Deshpande et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0258250 A1 | 11/2005 | Melick et al. |
| 2005/0272445 A1 | 12/2005 | Zellner |
| 2005/0280557 A1 | 12/2005 | Jha et al. |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0053283 A1 | 3/2006 | Feinleib et al. |
| 2006/0074544 A1 | 4/2006 | Morariu et al. |
| 2006/0129488 A1 | 6/2006 | Vincent |
| 2006/0156026 A1 | 7/2006 | Utin |
| 2006/0161626 A1 | 7/2006 | Cardina et al. |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0239131 A1 | 10/2006 | Nathan et al. |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1 | 1/2007 | Durham et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1 | 3/2007 | Holtzman et al. |
| 2007/0078988 A1 | 4/2007 | Miloushev et al. |
| 2007/0079120 A1 | 4/2007 | Bade et al. |
| 2007/0093246 A1 | 4/2007 | Adamany et al. |
| 2007/0094273 A1 | 4/2007 | Fritsch et al. |
| 2007/0094691 A1 | 4/2007 | Gazdzinski |
| 2007/0104215 A1 | 5/2007 | Wang et al. |
| 2007/0118880 A1 | 5/2007 | Mauro |
| 2007/0143210 A1 | 6/2007 | Yeung et al. |
| 2007/0150730 A1 | 6/2007 | Conti |
| 2007/0156850 A1 | 7/2007 | Corrion |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0188306 A1 | 8/2007 | Tethrake et al. |
| 2007/0192652 A1 | 8/2007 | Kao et al. |
| 2007/0197261 A1 | 8/2007 | Humbel |
| 2007/0214332 A1 | 9/2007 | Sonoda et al. |
| 2007/0226389 A1 | 9/2007 | Poortman |
| 2007/0261112 A1* | 11/2007 | Todd ............... G06F 21/577 726/11 |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1 | 1/2008 | Inoue et al. |
| 2008/0011825 A1 | 1/2008 | Giordano et al. |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0068166 A1 | 3/2008 | Lauper et al. |
| 2008/0089517 A1 | 4/2008 | Bianco et al. |
| 2008/0092213 A1 | 4/2008 | Wei et al. |
| 2008/0097793 A1 | 4/2008 | Dicks et al. |
| 2008/0100419 A1 | 5/2008 | Jatschka et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0160997 A1 | 7/2008 | Kim |
| 2008/0162361 A1 | 7/2008 | Sklovsky et al. |
| 2008/0162637 A1 | 7/2008 | Adamczyk et al. |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1 | 10/2008 | Sahita et al. |
| 2008/0271163 A1 | 10/2008 | Stillerman et al. |
| 2008/0274716 A1 | 11/2008 | Fok et al. |
| 2008/0281953 A1 | 11/2008 | Blaisdell |
| 2008/0304640 A1 | 12/2008 | Reilly |
| 2008/0320577 A1 | 12/2008 | Larduinat |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0132381 A1 | 5/2009 | Gangi |
| 2009/0141713 A1* | 6/2009 | Beverly ............... H04L 45/00 370/389 |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0215385 A1 | 8/2009 | Waters et al. |
| 2009/0224919 A1 | 9/2009 | Angell et al. |
| 2009/0227290 A1 | 9/2009 | Chien |
| 2009/0248445 A1 | 10/2009 | Harnick |
| 2009/0271321 A1 | 10/2009 | Stafford |

(56) References Cited

U.S. PATENT DOCUMENTS

| | | |
|---|---|---|
| 2009/0275364 A1 | 11/2009 | Morel et al. |
| 2009/0281947 A1 | 11/2009 | Erel |
| 2009/0289764 A1 | 11/2009 | Chiu |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1 | 12/2009 | Watt et al. |
| 2010/0031325 A1 | 2/2010 | Maigne et al. |
| 2010/0052844 A1 | 3/2010 | Wesby |
| 2010/0064341 A1 | 3/2010 | Aldera |
| 2010/0066486 A1 | 3/2010 | Park et al. |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0121156 A1 | 5/2010 | Yoo |
| 2010/0125512 A1 | 5/2010 | Jones et al. |
| 2010/0125904 A1 | 5/2010 | Nice et al. |
| 2010/0127868 A1 | 5/2010 | Hamilton et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153513 A1 | 6/2010 | Zahran |
| 2010/0153721 A1 | 6/2010 | Mellqvist |
| 2010/0162028 A1 | 6/2010 | Frank et al. |
| 2010/0167755 A1 | 7/2010 | Kim et al. |
| 2010/0190469 A1 | 7/2010 | Vanderveen et al. |
| 2010/0191613 A1 | 7/2010 | Raleigh |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0078760 A1 | 3/2011 | De Perthuis |
| 2011/0082711 A1 | 4/2011 | Poeze et al. |
| 2011/0107426 A1 | 5/2011 | Yen et al. |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |
| 2011/0218849 A1 | 9/2011 | Rutigliano et al. |
| 2011/0225293 A1 | 9/2011 | Rathod |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258443 A1 | 10/2011 | Barry |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0108295 A1 | 5/2012 | Schell et al. |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137101 A1 | 5/2012 | Arcese et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0166806 A1 | 6/2012 | Zhang et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0218084 A1 | 8/2012 | Arponen et al. |
| 2012/0220269 A1 | 8/2012 | Feng |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0274444 A1 | 11/2012 | Micali et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |

(56) References Cited

U.S. PATENT DOCUMENTS

| | | |
|---|---|---|
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0010641 A1 | 1/2013 | Dinan |
| 2013/0014259 A1 | 1/2013 | Gribble et al. |
| 2013/0019323 A1 | 1/2013 | Arvidsson et al. |
| 2013/0031374 A1 | 1/2013 | Thom et al. |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0061055 A1 | 3/2013 | Schibuk |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0086695 A1 | 4/2013 | Lakshminarayanan |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0260791 A1 | 10/2013 | Malinovskiy et al. |
| 2013/0262264 A1 | 10/2013 | Karstoft |
| 2013/0263212 A1 | 10/2013 | Faltyn et al. |
| 2013/0290359 A1 | 10/2013 | Eronen et al. |
| 2013/0290709 A1 | 10/2013 | Muppidi et al. |
| 2013/0310003 A1 | 11/2013 | Sadhvani et al. |
| 2013/0313314 A1 | 11/2013 | Jeng et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0345530 A1* | 12/2013 | McRoberts ......... A61B 5/0022 600/323 |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0052562 A1 | 2/2014 | Oliveira et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | OConnor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0143826 A1 | 5/2014 | Sharp et al. |
| 2014/0155025 A1 | 6/2014 | Parker et al. |
| 2014/0166745 A1 | 6/2014 | Graef et al. |
| 2014/0173747 A1 | 6/2014 | Govindaraju |
| 2014/0188412 A1 | 7/2014 | Mahajan et al. |
| 2014/0188738 A1 | 7/2014 | Huxham |
| 2014/0200051 A1 | 7/2014 | Liu |
| 2014/0215196 A1 | 7/2014 | Berlin |
| 2014/0222955 A1 | 8/2014 | Islam et al. |
| 2014/0245444 A1 | 8/2014 | Lutas et al. |
| 2014/0254381 A1 | 9/2014 | Racz et al. |
| 2014/0267332 A1 | 9/2014 | Chhabra et al. |
| 2014/0279523 A1 | 9/2014 | Lynam et al. |
| 2014/0279556 A1 | 9/2014 | Priebatsch et al. |
| 2014/0279558 A1 | 9/2014 | Kadi et al. |
| 2014/0298026 A1 | 10/2014 | Isozaki et al. |
| 2014/0331279 A1 | 11/2014 | Aissi et al. |
| 2015/0032976 A1 | 1/2015 | Chapier et al. |
| 2015/0106805 A1 | 4/2015 | Melander et al. |
| 2015/0172928 A1 | 6/2015 | Katzer et al. |
| 2015/0358455 A1 | 12/2015 | Mosher et al. |
| 2016/0004876 A1 | 1/2016 | Bye et al. |
| 2016/0142396 A1 | 5/2016 | McRoberts et al. |
| 2016/0150478 A1 | 5/2016 | Li et al. |
| 2016/0323731 A1 | 11/2016 | Mohammed et al. |
| 2017/0026840 A1 | 1/2017 | Eyal |
| 2017/0180395 A1* | 6/2017 | Stransky-Heilkron ..................... H04L 63/1416 |

FOREIGN PATENT DOCUMENTS

| | | |
|---|---|---|
| JP | 6171245 B2 | 8/2017 |
| JP | 6332766 B2 | 5/2018 |
| WO | WO2011025433 A1 | 3/2011 |
| WO | WO2012064171 A1 | 5/2012 |
| WO | WO2012085593 A1 | 6/2012 |
| WO | WO2013170228 A2 | 11/2013 |
| WO | WO2014004590 A2 | 1/2014 |
| WO | WO2014018575 A2 | 1/2014 |
| WO | WO2014025687 A2 | 2/2014 |
| WO | WO2014158431 A1 | 10/2014 |

OTHER PUBLICATIONS

Japanese Decision for Grant dated Jun. 6, 2017, JP Application Serial No. 2015-524404.
FAIPP Pre-Interview Communication dated Aug. 4, 2014, U.S. Appl. No. 13/844,357, filed Mar. 15, 2013.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Final Office Action dated Apr. 7, 2015, U.S. Appl. No. 13/844,145, filed Mar. 15, 2013.
Notice of Allowance dated Jul. 6, 2015, U.S. Appl. No. 13/844,145, filed Mar. 15, 2013.
FAIPP Pre-Interview Communication dated Mar. 1, 2016, U.S. Appl. No. 13/863,376, filed Apr. 15, 2013.
Notice of Allowance dated May 2, 2016, U.S. Appl. No. 13/863,376, filed Apr. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Feb. 12, 2015, U.S. Appl. No. 14/066,661, filed Oct. 29, 2013.
Notice of Allowance dated Jul. 6, 2015, U.S. Appl. No. 14/066,661, filed Oct. 29, 2013.
Restriction Requirement dated Aug. 14, 2014, U.S. Appl. No. 13/594,777, filed Aug. 25, 2012.
Notice of Allowance dated Dec. 3, 2014, U.S. Appl. No. 13/594,777, filed Aug. 25, 2012.
Notice of Allowance dated Nov. 9, 2015, U.S. Appl. No. 14/659,614, filed Mar. 17, 2015.
FAIPP Pre-Interview Communication dated Jul. 17, 2014, U.S. Appl. No. 13/594,778, filed Aug. 25, 2012.
Notice of Allowance dated Sep. 19, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.

(56) References Cited

OTHER PUBLICATIONS

First Action Interview Office Action dated Dec. 3, 2014, U.S. Appl. No. 13/594,779, filed Aug. 25, 2012.
Notice of Allowance dated Aug. 14, 2015, U.S. Appl. No. 13/594,779, filed Aug. 25, 2012.
Office Action dated May 5, 2014, U.S. Appl. No. 13/786,450, filed Mar. 5, 2013.
Final Office Action dated Nov. 7, 2014, U.S. Appl. No. 13/786,450, filed Mar. 5, 2013.
Notice of Allowance dated Feb. 26, 2015, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
First Action Interview Office Action dated Apr. 7, 2015, U.S. Appl. No. 13/802,404, filed Mar. 13, 2013.
Final Office Action dated Aug. 27, 2015, U.S. Appl. No. 13/802,404, filed Mar. 13, 2013.
Advisory Action dated Nov. 16, 2015, U.S. Appl. No. 13/802,404, filed Mar. 13, 2013.
Office Action dated May 17, 2016, U.S. Appl. No. 13/802,404, filed Mar. 13, 2013.
Notice of Allowance dated Nov. 18, 2016, U.S. Appl. No. 13/802,404, filed Mar. 13, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
FAIPP Pre-Interview Communication dated Mar. 26, 2015, U.S. Appl. No. 13/939,175, filed Jul. 10, 2013.
Notice of Allowance dated Jul. 7, 2015, U.S. Appl. No. 13/939,175, filed Jul. 10, 2013.
FAIPP Pre-Interview Communication dated Oct. 29, 2014, U.S. Appl. No. 13/844,282, filed Mar. 15, 2013.
Final Office Action dated Mar. 24, 2015, U.S. Appl. No. 13/844,282, filed Mar. 15, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Feb. 26, 2016, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
European Examination Report dated Jun. 1, 2016, EPC Application Serial No. 14775613.4, filed on Jul. 8, 2015.
European Examination Report dated Feb. 14, 2017, EPC Application Serial No. 14775613.4, filed on Jul. 8, 2015.
European Examination Report dated Sep. 20, 2017, EPC Application Serial No. 14775613.4, filed on Jul. 8, 2015.
FAIPP Pre-Interview Communication dated Mar. 24, 2015, U.S. Appl. No. 13/964,112, filed Aug. 12, 2013.
Notice of Allowance dated Aug. 3, 2015, U.S. Appl. No. 13/964,112, filed Aug. 12, 2013.
Japanese Office Action dated Jan. 16, 2018, Japanese Application Serial No. 2-2016-500275, filed on Jun. 25, 2015.
Japanese Decision for Grant dated Apr. 3, 2018, Japanese Application Serial No. 2-2016-500275, filed on Jun. 25, 2015.
FAIPP Pre-Interview Communication dated Feb. 7, 2018, U.S. Appl. No. 14/939,887, filed Nov. 12, 2015.
Paczkowski, Lyle W., et al., "Secure and Trusted Device-Based Billing and Charging Process Using Privilege for Network Proxy Authentication and Audit," filed Nov. 12, 2015, U.S. Appl. No. 14/939,887.
Final Office Action dated Jun. 28, 2018, U.S. Appl. No. 14/939,887, filed Nov. 12, 2015.
Office Action dated Jun. 11, 2018, U.S. Appl. No. 15/719,813, filed Sep. 29, 2017.
FAIPP Pre-Interview Communication dated Mar. 20, 2014, U.S. Appl. No. 13/482,731, filed May 29, 2012.
Notice of Allowance dated May 27, 2014, U.S. Appl. No. 13/482,731, filed May 29, 2012..
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
Office Action dated Aug. 29, 2014, U.S. Appl. No. 13/470,203, filed May 11, 2012.
Notice of Allowance dated Dec. 22, 2014, U.S. Appl. No. 13/470,203, filed May 11, 2012.
FAIPP Pre-Interview Communication dated Jul. 2, 2015, U.S. Appl. No. 14/632,850, filed Feb. 26, 2015.
Final Office Action dated Nov. 6, 2015, U.S. Appl. No. 14/632,850, filed Feb. 26, 2015.
Advisory Action dated Jan. 29, 2016, U.S. Appl. No. 14/632,850, filed Feb. 26, 2015.
Examiner's Answer dated Nov. 16, 2016, U.S. Appl. No. 14/632,850, filed Feb. 26, 2015.
Decision on Appeal dated Sep. 15, 2017, U.S. Appl. No. 14/632,850, filed Feb. 26, 2015.
FAIPP Pre-Interview Communication dated May 12, 2014, U.S. Appl. No. 13/294,177, filed Nov. 11, 2011.
Notice of Allowance dated Oct. 8, 2014, U.S. Appl. No. 13/294,177, filed Nov. 11, 2011.
FAIPP Pre-Interview Communication dated Mar. 25, 2015, U.S. Appl. No. 13/532,588, filed Jun. 25, 2012.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.
FAIPP Pre-Interview Communication dated Sep. 25, 2014, U.S. Appl. No. 13/533,969, filed Jun. 27, 2012.
Notice of Allowance dated Feb. 5, 2015, U.S. Appl. No. 13/533,969, filed Jun. 27, 2012.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Office Action dated Dec. 15, 2014, U.S. Appl. No. 13/571,348, filed Aug. 10, 2012.

(56) References Cited

OTHER PUBLICATIONS

Notice of Allowance dated Jun. 17, 2015, U.S. Appl. No. 13/571,348, filed Aug. 10, 2012.
FAIPP Pre-Interview Communication dated Mar. 21, 2017, U.S. Appl. No. 14/855,364, filed Sep. 15, 2015.
Notice of Allowance dated Jul. 6, 2017, U.S. Appl. No. 14/855,364, filed Sep. 15, 2015.
Restriction Requirement dated Jan. 2, 2015, U.S. Appl. No. 13/762,319, filed Feb. 7, 2013.
FAIPP Pre-Interview Communication dated Mar. 10, 2015, U.S. Appl. No. 13/762,319, filed Feb. 7, 2013.
Notice of Allowance dated Jun. 9, 2015, U.S. Appl. No. 13/762,319, filed Feb. 7, 2013.
Notice of Allowance dated Aug. 30, 2013, U.S. Appl. No. 13/540,437, filed Jul. 2, 2012.
FAIPP Pre-Interview Communication dated May 21, 2015, U.S. Appl. No. 14/090,667, filed Nov. 26, 2013.
Notice of Allowance dated Aug. 4, 2015, U.S. Appl. No. 14/090,667, filed Nov. 26, 2013.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance dated Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
Notice of Allowance dated Sep. 21, 2015, U.S. Appl. No. 14/148,714, filed Jan. 6, 2014.
Notice of Allowance dated Oct. 18, 2017, U.S. Appl. No. 14/632,850, filed Feb. 26, 2015.
FAIPP Pre-Interview Communication dated Oct. 12, 2017, U.S. Appl. No. 15/365,934, filed Nov. 30, 2016.
Notice of Allowance dated Dec. 7, 2017, U.S. Appl. No. 15/365,934, filed Nov. 30, 2016.
Notice of Allowance dated Aug. 15, 2018, U.S. Appl. No. 15/005,123, filed Jan. 25, 2016.
Advisory Action dated Aug. 15, 2018, U.S. Appl. No. 14/939,887, filed Nov. 12, 2015.
Pre-Appeal Decision dated Oct. 24, 2018, U.S. Appl. No. 14/939,887, filed Nov. 12, 2015.
Office Action dated Aug. 25, 2016, U.S. Appl. No. 13/860,338, filed Apr. 10, 2013.
Final Office Action dated Mar. 9, 2017, U.S. Appl. No. 13/860,338, filed Apr. 10, 2013.
Advisory Action dated Jun. 1, 2017, U.S. Appl. No. 13/860,338, filed Apr. 10, 2013.
Notice of Allowance dated Jul. 28, 2017, U.S. Appl. No. 13/860,338, filed Apr. 10, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
Notice of Allowance dated Aug. 24, 2016, U.S. Appl. No. 13/912,190, filed Jun. 6, 2013.
FAIPP Pre-Interview Communication dated Apr. 15, 2015, U.S. Appl. No. 14/085,474, filed Nov. 20, 2013.
Notice of Allowance dated May 29, 2015, U.S. Appl. No. 14/085,474, filed Nov. 20, 2013.
FAIPP Pre-Interview Communication dated Feb. 4, 2015, U.S. Appl. No. 14/075,663, filed Nov. 8, 2013.
First Action Interview Office Action dated Apr. 10, 2015, U.S. Appl. No. 14/075,663, filed Nov. 8, 2013.
Notice of Allowance dated Jul. 1, 2015, U.S. Appl. No. 14/075,663, filed Nov. 8, 2013.
FAIPP Pre-Interview Communication dated Feb. 24, 2015, U.S. Appl. No. 14/163,047, filed Jan. 24, 2014.
Notice of Allowance dated Apr. 9, 2015, U.S. Appl. No. 14/163,047, filed Jan. 24, 2014.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Apr. 27, 2017, U.S. Appl. No. 14/606,011, filed Jan. 26, 2015.
Notice of Allowance dated Aug. 7, 2017, U.S. Appl. No. 14/606,011, filed Jan. 26, 2015.
FAIPP Pre-Interview Communication dated Aug. 8, 2016, U.S. Appl. No. 14/596,218, filed Jan. 14, 2015.
FAIPP Office Action dated Apr. 5, 2017, U.S. Appl. No. 14/596,218, filed Jan. 14, 2015.
Notice of Allowance dated May 30, 2017, U.S. Appl. No. 14/596,218, filed Jan. 14, 2015.
FAIPP Pre-Interview Communication dated Nov. 18, 2015, U.S. Appl. No. 14/681,077, filed Apr. 7, 2015.
First Action Interview Office Action dated Mar. 28, 2016, U.S. Appl. No. 14/681,077, filed Apr. 7, 2015.
Notice of Allowance dated Jun. 15, 2016, U.S. Appl. No. 14/681,077, filed Apr. 7, 2015.
Office Action dated Mar. 8, 2017, U.S. Appl. No. 14/947,257, filed Nov. 20, 2015.
Notice of Allowance dated Jul. 24, 2017, U.S. Appl. No. 14/947,257, filed Nov. 20, 2015.
FAIPP Pre-Interview Communication dated Aug. 5, 2015, U.S. Appl. No. 13/857,141, filed Apr. 4, 2013.
Notice of Allowance dated Dec. 17, 2015, U.S. Appl. No. 13/857,141, filed Apr. 4, 2013.
FAIPP Pre-Interview Communication dated Oct. 5, 2016, U.S. Appl. No. 15/069,921, filed Mar. 14, 2016.
Notice of Allowance dated Mar. 10, 2017, U.S. Appl. No. 15/069,921, filed Mar. 14, 2016.
Restriction Requirement dated Jan. 5, 2015, U.S. Appl. No. 13/857,139 filed Apr. 4, 2013.
FAIPP Pre-Interview Communication dated Jun. 2, 2015, U.S. Appl. No. 13/857,139 filed Apr. 4, 2013.
Office Action dated Nov. 19, 2015, U.S. Appl. No. 13/857,139 filed Apr. 4, 2013.
Notice of Allowance dated May 26, 2016, U.S. Appl. No. 13/857,139 filed Apr. 4, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Notice of Allowance dated Jun. 11, 2015, U.S. Appl. No. 13/857,138, filed Apr. 4, 2013.
FAIPP Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http://online.wsj,com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.

(56) References Cited

OTHER PUBLICATIONS

Foreign Communication from a Related Counterpart—International Search Report and Written Opinion, dated Dec. 2, 2013, PCT/US13/40673, filed on May 10, 2013.
Foreign Communication from a Related Counterpart—International Preliminary Report on Patentability, dated Nov. 20, 2014, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Search Report and Written Opinion, dated Apr. 22, 2014, PCT/US13/53617, filed on Aug. 5, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Preliminary Report on Patentability, dated Feb. 5, 2015, PCT/US13/51750, filed on Jul. 24, 2013.
Foreign Communication from a Related Counterpart—International Search Report and Written Opinion, dated Jul. 11, 2014, PCT/US14/16651, filed on Feb. 16, 2014.
Foreign Communication from a Related Counterpart—International Preliminary Report on Patentability, dated Sep. 24, 2015, PCT/US14/16651, filed on Feb. 16, 2014.
Ahmed, Farid, et al., "Correlation-based Watermarking Method for Imagine Authentication Applications", Society of Photo-Optical Instrumentation Engineers, Feb. 17, 2004, pp. 1834-1838.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/ pubs/ieeeic01.pdf.
Dietrich, Kurt, et al., "Implementation Aspects of Mobile and Embedded Trusted Computing," Institute for Applied Information Processing and Communications, Trusted Computing Interaction Conference, 2009.
Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003.
Hamdare, Safa, et al., "Securing SMS Based One Time Password Technique from Man in the Middle Attach," IJETT, vol. 11 Issue 3, May 2014.
Twin Connect—"User Guide for Windows"; 30 pages; dated 2013.
WiseGEEK,"What is a USB Dongle?," http://www.wisegeek.com/what-is-a-usb-dongle.htm, four pages, dated Jul. 25, 2017.
FAIPP Pre-Interview Communication dated May 9, 2017, U.S. Appl. No. 14/853,492, filed Sep. 14, 2015.
Notice of Allowance dated Jul. 7, 2017, U.S. Appl. No. 14/853,492, filed Sep. 14, 2015.
Bye, Stephen James, et al., "Delivering Digital Content to a Mobile Device via a Digital Rights Clearing House", filed Apr. 10, 2013, U.S. Appl. No. 13/860,338.
Mccracken, Billy Gene, Jr., et al. "Mobile Communication Device Profound Identity Brokering Framework", filed Nov. 30, 2016, U.S. Appl. No. 15/365,934.
Neson, Tracy L., et al., "Mated Universal Serial Bus (USB) Wireless Dongles Configured with Destination Addresses," filed Jan. 26, 2015, U.S. Appl. No. 14/606,011.
Paczkowski, Lyle W., et al., "System and Method for Secure USIM Wireless Network Access," filed Nov. 20, 2015, U.S. Appl. No. 14/947,257.
Paczkowski, Lyle W., et al., "System and Method for Secure USIM Wireless Network Access," filed Sep. 29, 2017, U.S. Appl. No. 15/719,813.
Bertz, Lyle T., et al., "Hardware Assisted Provenance Proof of Named Data Networking Associated to Device Data, Addresses, Services, and Servers," filed Sep. 14, 2015, U.S. Appl. No. 14/853,492.
Notice of Allowance dated Dec. 31, 2018, U.S. Appl. No. 14/939,887, filed Nov. 12, 2015.
Notice of Allowance dated Feb. 6, 2019, U.S. Appl. No. 15/719,813, filed Sep. 29, 2017.

* cited by examiner

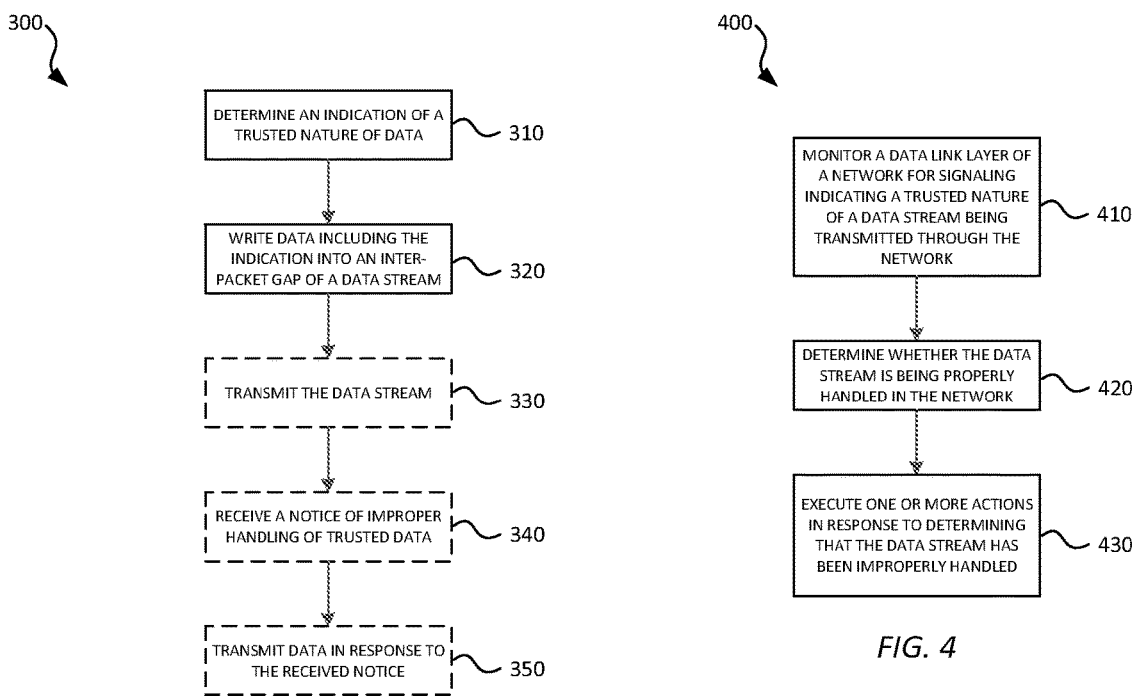

DATA LINK LAYER TRUST SIGNALING IN COMMUNICATION NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

To facilitate a high volume of communications traversing a network, the network may simultaneously support multiple channels (which may also be referred to as communication links, sessions, or other like terms). Some of the channels may be secure channels (e.g., trusted and/or encrypted) and some of the channels may be unsecured channels. When communications are transmitted through the network, they may designate only the secure channels, only the unsecure channels, or any channels may be utilized for routing the communications to their destination. Sometimes, communications which are designated for routing using only the secure channels may nonetheless be inadvertently routed at some location in the network, at least in part, using the unsecured channels.

SUMMARY

In an embodiment, an apparatus comprising a network communication interface to communicatively couple the apparatus to a network, a processor coupled to the network communication interface, and a memory coupled to the processor. The processor is configured to execute instructions to cause the apparatus to determine an indicator of a trusted nature of data for transmission through the network, write the data to a frame of a data stream, write the indicator to an inter-packet gap of the data stream, and transmit the data stream to the network via the network communication interface.

In another embodiment, an apparatus comprising a network communication interface to communicatively couple the apparatus to a network, a processor coupled to the network communication interface, a memory coupled to the processor, and a trusted data monitoring application stored in the memory. When executed, the trusted data monitoring application causes the processor to monitor the network for existence of a data stream containing an indicator of a trusted nature of data contained in the data stream, determine whether the data stream is being properly handled in the network when the data stream contains the indicator of the trusted nature of data contained in the data stream, and execute at least one action in the network in response to the data stream not being properly handled in the network.

In yet another embodiment, a method executed in a communications network comprising writing, by a first network element, into an inter-packet gap of a data stream, an indication of a trusted nature of data included in a frame of the data stream, transmitting, by the first network element, the data stream through the communications network, monitoring, by a second network element, the communications network at a data link layer for existence of the indication of the trusted nature of data in the inter-packet gap of the data stream, determining, by the second network element, that the data stream is being improperly handled in the communications network, and transmitting, by the second network element, a notification of improper handling of the data stream in the communications network to a notification destination.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 illustrates an embodiment of a flowchart of a method.

FIG. 4 illustrates an embodiment of a flowchart of a method.

DETAILED DESCRIPTION

Figure 1:
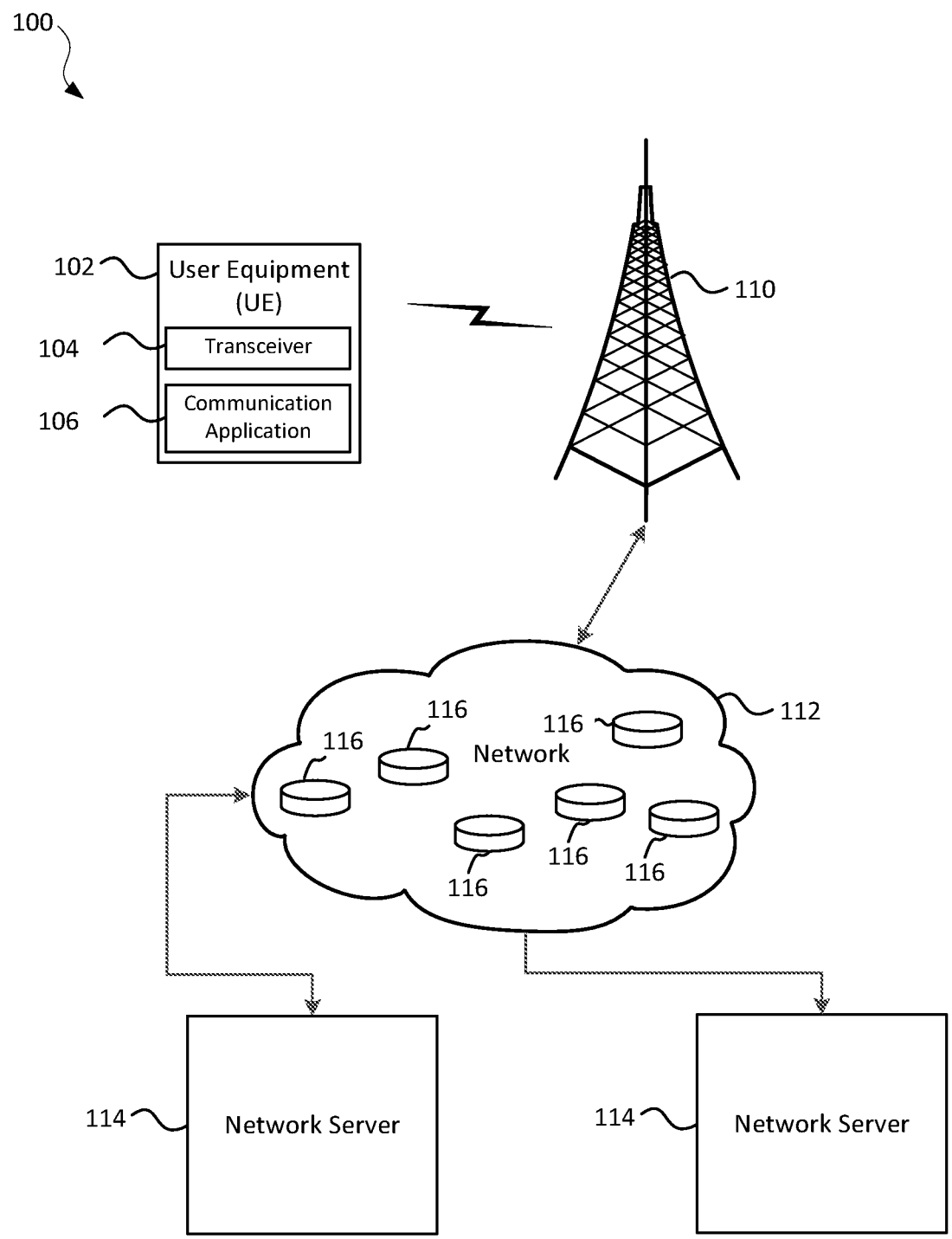
FIG. 1 illustrates an embodiment of a communication system.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A trusted security zone is one way for a computer system to provide a level of assurance or confidence in secure handling of data. For network functions that are implemented according to software solutions in a cloud-computing environment (e.g., such as by network function virtualization), a trusted security zone may be established in which the network functions operate. In a communication session between two computer systems, each computer system may include a trusted security zone and be capable of operating in trust (e.g., performing operations using hardware and/or software located in the trusted security zone). A trusted communication session may be established between the two computer systems by which one of the computer systems transmits encrypted, trusted data to the second computer system through a network. The network through which the encrypted, trusted data is transmitted may include nodes (e.g., gateways, switches, hubs, etc.) which are not trusted or which have both trusted and untrusted components. These nodes may not be permitted to decrypt, view, or even have access to the trusted data transmitted between the computer systems operating in trust. As used herein, a node that is not permitted to decrypt, view, or even have access to the trusted data transmitted between the computer systems operating in trust may be a node that does not have knowledge of an encryption and/or decryption key associated with the trusted data, a node that does not include a trusted security zone, a node that demonstrates a consistent mishandling of trusted data, a node that is known to be comprised by malicious activity, etc. However, in some circumstances, the trusted data transmitted between the computer systems operating in trust may traverse an untrusted node or an untrusted portion of a node.

Embodiments disclosed herein provide for signaling a trusted nature of data (e.g., such as a data stream comprising a plurality of data packets) transmitted in a network with a minimal increase in data overhead size (e.g., as measured in bytes). At least some of the embodiments further provide for signaling a notification destination for transmitting a notification of improper receipt of trusted data (e.g., receipt by a trusted computer system which receives trusted data in an untrusted manner or receipt by an untrusted computer system which receives trusted data). At least some of the embodiments further provide for signaling of fidelity of communication (e.g., an indication that the trusted data has not been modified or otherwise tampered with as it traversed the network from one trusted computer system to another trusted computer system), additional information, instructions, and/or commands to be used and/or executed by the computer system providing the notification of the improper receipt of the trusted data. Further disclosed herein are embodiments that provide for processing of received data having the disclosed signaling and transmitting a notification to the notification destination when the trusted data is improperly received. The signaling is performed, for example, at a lower level protocol layer, such as the data link layer. The signaling is performed, in some embodiments, during a gap between transmissions of data packets in a data stream (e.g., an inter-packet gap) without modifying a timing of transmission of the data packets. In some embodiments, the signaling is performed in a single gap between transmissions of data packets in the data stream, while in other embodiments the signaling is performed in multiple gaps between transmissions of data packets in the data stream (e.g., in a serial manner such as may be used to indicate fidelity of the communications). In some embodiments, the signaling is performed only for trusted data. In other embodiments, the signaling is performed for both trusted data and untrusted data, where the signaling indicates a trusted nature of the trusted data and an untrusted nature of the untrusted data. In some embodiments, the signaling is performed at a low-level communication protocol layer (e.g., such as the data link layer) such that a number of communication protocol layers that are traversed by data and which may decapsulate, interpret, parse, or otherwise handle or manipulate the data to determine the trusted nature of the data may be minimized.

When data is transmitted between a trusted sender and a trusted recipient, the data traverses multiple nodes. The nodes may be intranet nodes (e.g., nodes within a private network which may be under the control of a single entity) or internet nodes (e.g., public nodes which may be controlled by any one or more entities) and may operate exclusively in trust, exclusively in an untrusted manner, or a combination of both trusted and untrusted operation. In some embodiments, the nodes may only be permitted to receive and/or transmit trusted data utilizing portions of the nodes operating in trust and any receipt and/or transmission of the trusted data utilizing portions of the nodes that are not operating in trust may be improper. In other embodiments, transmission of the trusted data traversing untrusted nodes may be advantageous and/or unavoidable, however it may still be improper for the untrusted nodes to manipulate, alter, access, or otherwise view the trusted data. In such embodiments, the signaling disclosed herein indicates to the nodes whether received data is trusted data (and therefore if the data was received improperly if it was received in an untrusted manner) and whether the node may access the data. The signaling disclosed herein, in some embodiments, is further operable to function as an integrity check to verify integrity of the trusted data, for example, to indicate whether the data has, or has probably, been improperly manipulated by any of the multiple nodes that were traversed between the trusted sender and the trusted recipient.

In some embodiments, the nodes include, or are configured to execute, a client or application operating at a protocol layer higher than the data link layer. The client is configured to monitor the data link layer to determine whether the signaling is present in data received by the node. The client, in some embodiments, determines whether the signaling is present without requiring the node to process the data at a higher level protocol layer to determine whether the received data is trusted data.

When a node improperly receives trusted data (e.g., as indicated by the client detecting the presence of the signaling), in some embodiments the node takes action in response the improper receipt. For example, the node may notify one or more other nodes (e.g., such a node from which the trusted data was improperly received), the source of the trusted data (e.g., the trusted sender), the destination of the trusted data (e.g., the trusted recipient), a notification server (e.g., a preprogrammed destination known to the node for reporting improper receipt of trusted data), and/or a destination indicated in, or along with, the signaling of the trusted nature of the data that is determined by the client. In addition, or as an alternative, to providing notification, the node may perform actions related to the improperly received trusted data. For example, the node may drop or otherwise discard the improperly received trusted data, redirect the improperly received trusted data to a destination other than its originally intended destination, forward the improperly received trusted data along a trusted path toward the trusted recipient, return the trusted data to the trusted sender, and/or perform other analysis or processing of the improperly received trusted data.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main chipset and protecting the hardware root of trust removes the need for separate secure hardware to authenticate the device or user. To ensure the integrity of the applications requiring trusted data, such as a financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. In some embodiments, the trusted tokens may comprise a particular series or pattern of bits of data known to a sender, a recipient, and or one or more nodes in the trusted end-to-end communication and may be included in one or more gaps between data packets transmitted according to the trusted end-to-end communication links, for example, as described above and in greater detail below. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, routers, gateways, switches, sensors, networking hubs, medical devices, point-of-sale terminals, industrial automation, handheld terminals, automotive, etc.

The trusted security zone is implemented by partitioning all of the hardware and software resources of the device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a user input interface or a secure location in memory. Less secure peripherals such as wireless radios may be disabled completely while the secure partition is being accessed, while other peripherals may only be accessed from the secure partition. While the secure partition is being accessed through the trusted execution environment, the main operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the device so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the device which may execute in the normal partition operating system described above. The trusted security zone runs a separate operating system for the secure partition that is installed by the device manufacturer or vendor, and users are not able to install new applications in or alter the contents of the trusted security zone.

Turning now to FIG. 1, an embodiment of a communication system 100 is disclosed. In an embodiment, the system 100 comprises user equipment (UE) 102, an enhanced node B (eNB) 110, a network 112, and one or more network servers 114, which may in some embodiments be referred to as a compute resource. The UE 102 may comprise a radio transceiver 104, and one or more communication applications 106. The UE 102 is configured to use the radio transceiver 104 to establish a wireless communication link with the eNB 110, and the eNB 110 provides communications connectivity of the UE 102 to the network 112. The network 112 may comprise any combination of private and/or public networks. The one or more network servers 114 may be coupled to network 112 and may receive information from, and/or transmit information to, the UE 102, and/or may transmit information between a first network server 114 and a second network server 114. The network 112 may further comprise any combination of network nodes 116 configured to facilitate transmission of data between two devices, for example, between the UE 102 and the network server 114, between a first UE 102 and a second UE 102, between the first network server 114 and the second network server 114, etc. For example, the network nodes 116 may include any combination of switches, routers, hubs, gateways, etc.

It is understood that the system 100 may comprise any number of UEs 102, eNBs 110, and network servers 114. The collectivity of eNBs 110 may be said to comprise a radio access network, in that these eNBs 110 may provide a radio communication link to the UE 102 to provide access to the network 112. The radio access network may be abstracted in different ways and may comprise, in addition to the eNBs 110, servers and data stores such as home location registers (HLRs) or servers that implement the functionality of home location registers, visitor location registers (VLRs) or servers that implement the functionality of visitor location registers, base station controllers (BSCs), mobile switching centers (MSCs), gateways, hubs, routers, and/or other network nodes that are specifically associated with providing wireless access and connectivity to the UEs 102 among themselves or among the UEs 102, eNBs 110, and/or network servers 114.

It is also understood that the eNB 110 may comprise any number of devices that facilitate wireless communication between UE 102 and network 112. For example, the eNB 110 may be a base transceiver station (BTS), a radio base station (RBS), a node B, or any other device that facilitates wireless communication between UE 102 and network 112.

The radio transceiver 104 may communicate with the eNB 110 using any of a variety of wireless communication protocols including a code division multiple access (CDMA) wireless communication protocol, a global system for mobile communication (GSM) wireless communication protocol, a LTE wireless communication protocol, a worldwide interoperability for microwave access (WiMAX) wireless communication protocol, or another wireless communication protocol. The UE 102 may be any of a mobile phone, a personal digital assistant (PDA), a media player, a wireless enabled computer, a wearable computer, a headset computer, a laptop computer, a notebook computer, a tablet computer, a smartphone, and Internet of Things (IoT) device, or other mobile communication or electronic device. In an embodiment, the UE 102 may have other components (not shown) such as a near field communication (NFC) radio transceiver, a wireless local area network (WLAN) radio transceiver, or other components.

The communication applications 106 may comprise a voice communication application, a data communication application, a web browser application, an email application, a short message system (SMS) or texting application, an instant message system (IMS) application, a multimedia message system (MMS) application, and/or other communication applications. The communication applications 106 may be standard communication applications that are delivered by an original equipment manufacturer (OEM) who assembles the UE 102 or may be third-party applications added to the UE 102 by a user. The communication applications 106 may be stored as firmware or software in a trusted memory area of the UE 102. The communication applications 106 may expose application programming interfaces (APIs) accessible to other applications to provide wireless communication functionality to the other applications.

In some embodiments, at least some of the network nodes 116 include a trusted security environment. When a communication link is established between a source and a destination (e.g., from a UE 102 or a network server 114 to any other UE 102 or network server 114), the communication link may include one or more network nodes 116 such that data traveling from the source to the destination traverses at least some of the network nodes 116. When the communication link is a trusted communication link (or when trusted data is being communicated via the communication link), the network nodes 116 may be permitted to only receive and transmit the trusted data via trusted hardware of the network nodes 116 and/or while the network nodes 116 are operating in trust. When one of the network nodes 116 receives the trusted data in an untrusted manner, such as through a communication link other than the trusted communication link, through untrusted hardware (e.g., an untrusted network interface), or while not operating in trust, the trusted data may be said to be improperly received by the network node 116.

In some embodiments, at least some of the network nodes 116 are configured to monitor the communication link to determine whether data being communicated via the communication link is trusted data. The network nodes 116 monitor the communication link at a low level communication protocol layer, for example, at the data link layer. Monitoring the communication link at the low level, in some embodiments, may have an advantage of allowing the network node to determine whether data being communicated via the communication link is trusted data without processing the data at a higher level communication protocol layer, such as the network layer or the application layer. Monitoring the communication link at the low level rather than the high level may further have an advantage of allowing the network nodes 116 to determine the trusted nature of data without requiring a network node to potentially break trust in making the determination (e.g., when the network node 116 is not trusted or not permitted to view the information contained in the trusted data, such as when the trusted data is encrypted).

To monitor the communication link at the low level, at least some of the network nodes 116 implement a client (e.g., a trusted data monitoring client or application) to determine whether data being communicated via the communication link is trusted data, and thereby whether trusted data is improperly received by the network node 116. In some embodiments, the client may operate at the network layer, the application layer, or at any other suitable layer above the data link layer. In other embodiments, the client may operate at the data link layer.

In some embodiments, improper receipt of the trusted data by a network node 116 may break trust such that the improperly received trusted data is no longer trusted. In such embodiments, the network node 116 may drop or otherwise discard the improperly received trusted data since it can no longer be trusted. Alternatively, the network node 116 may redirect the improperly received trusted data to a destination other than its originally intended destination, forward the improperly received trusted data along a trusted path toward the trusted recipient, return the trusted data to the trusted sender, and/or perform other analysis or processing of the improperly received trusted data.

In addition to performing certain handling of the improperly received trusted data, the network node 116 may also inform one or more entities or devices upon improper receipt of the trusted data. For example, the network node 116 may notify one or more other network nodes 116 (e.g., such a network node 116 from which the trusted data was improperly received), the source of the trusted data (e.g., the trusted sender), the destination of the trusted data (e.g., the trusted recipient), a network server 114 configured to receive notifications of improper receipt of trusted data (e.g., a preprogrammed destination known to the network node 116 for reporting improper receipt of trusted data), and/or a destination indicated in, or along with, the signaling of the trusted nature of the data that is determined by the client. In some embodiments, the notification of improper receipt of trusted data may be generated and/or transmitted by the client, while in other embodiments the notification of improper receipt of trusted data may be generated and/or transmitted by another client or application operating on the network node 116.

In some embodiments, the network node 116 does not improperly receive the trusted data but observes the trusted data being handled in an untrusted manner (e.g., being transmitted along untrusted communication lines, being transmitted between untrusted network elements, being transmitted in an unencrypted form, etc.). For example, communications at the data link layer may be broadcast communications in which a transmitting network element transmits the communications along a communications line that is shared among multiple network elements, one or more of which are the intended recipient of the communications and one or more of which are not the intended recipient of the communications. The intended recipient of the communications listens on the communications line for communications having an address or other identifier of the intended recipient, and processes communications that include the address or identifier of the intended recipient. Network elements for which an address or identifier is not included in the communications generally ignore the communications.

The network node 116 may monitor the communications line to identify trusted data (e.g., according to the signaling of the trusted nature of the data) and determine whether the trusted data is being handled in an untrusted manner, for example, based on a detection or determination by the client operating on the network node 116. The network node 116 may monitor the communications line, for example, by reading all communications traversing the communications line, regardless of whether the network node 116 is the intended recipient of the communications, or is included as an intermediate destination or hop in a route of the communications through the network 112, to determine (e.g., by way of the client) whether any communications include the signaling of the trusted nature of the data. In yet other embodiments, when the network node 116 receives the trusted data but is not operating in a trusted manner (e.g., not executing in the trusted security zone), the network node 116 may transition to the operating in the trusted manner at least partially in response to existence of the signaling indicating the trusted nature of the data.

When the network node 116 determines that trusted data is being handled in an untrusted manner on a communications line monitored by the network node 116, the network node 116 may inform one or more entities or devices upon improper receipt of the trusted data. For example, the network node 116 may notify one or more other network nodes 116 (e.g., such a network node 116 from which the trusted data was improperly sent and/or a network node 116 to which improperly received the trusted data), the source of the trusted data (e.g., the trusted sender), the destination of the trusted data (e.g., the trusted recipient), a network server 114 configured to receive notifications of untrusted handling of trusted data (e.g., a preprogrammed destination known to the network node 116 for reporting untrusted handling of trusted data), and/or a destination indicated in, or along with, the signaling of the trusted nature of the data that is determined by the client. In some embodiments, the notification of untrusted handling of trusted data may be generated and/or transmitted by the client, while in other embodiments the notification of untrusted handling of trusted data may be generated and/or transmitted by another client or application operating on the network node 116.

As discussed above, the client executing on the network node 116 determines whether communications traversing the communications link include signaling indicating a trusted nature of the data. The signaling is present, for example, in an inter-packet gap existing in a data stream (e.g., a group of data packets that together form a single communication between a sender and a recipient) present on the communications link. For example, a gap having a length of about 96 bits may exist between a first data packet and a second data packet in the data stream; such gap may be referred to as the inter-packet gap. The inter-packet gap may include no data (e.g., each bit of the 96 bits may be 0), bits which may be ignored upon receipt by all network elements (e.g., an arbitrary arrangement of bits in the 96 bits having a value of either 0 or 1), bits which may be ignored upon receipt by all but some network elements (e.g., bits, such as the signaling disclosed herein, that are arranged in a pattern known to some network elements and not known to other network elements), or a combination of any of the foregoing (e.g., a portion of the gap may include bits which are arranged in a pattern and a portion of the gap may include no data or bits which may be ignored). In some implementations of currently existing devices in the field, the inter-packet gap and/or any data or information appearing in the inter-packet gap, may be ignored by the existing devices. For example, the existing devices may not parse and/or interpret data or information in the gap. Some of the existing devices may use the inter-packet gap for timing synchronization but do not treat the inter-packet gap as having possible signal content. It should be understood that the above 96-bit gap is merely exemplary, and a length of the gap may be dependent upon standards requirements, a communication protocol being used, a transmission medium being used, network characteristics (such as delays), device characteristics (such as delays, tolerances, etc.), and/or other like criteria.

In some embodiments, a particular pattern of the signaling may be determined by a source of the communication stream (e.g., a device at which the communication stream originates). For example, the inter-packet gap may include about 96 bits as discussed above and the trusted sender may write or otherwise set at least some of the data bits according to the pattern of the signaling prior to transmitting a data stream that includes the inter-packet gap. The trusted sender may write the signaling at least partially according to instructions received from a server, such as the network server 114. Alternatively, the trusted sender may write the signaling at least partially according to a pattern determined by the trusted sender. In other embodiments, data bits may be written or otherwise set in the inter-packet gap to the pattern of the signaling by another device in the system 100 such as a network node 116 serving as a gateway to the network 112 from the trusted sender.

The signaling may include any information such as, but not limited to, an indication of a trusted nature of the data (e.g., a particular pattern of data bits known as an indicator of trust), one or more addresses and/or identifiers (e.g., a device address and/or identifier for notification of improper receipt or handling of the trusted data), a length of the trusted data, etc. In some embodiments, the signaling may be encrypted, while in other embodiments the signaling may be unencrypted (e.g., transmitted "in the open"). At least a portion of the particular pattern of the signaling may be communicated to one or more network nodes 116 in advance, such that the network nodes 116 are enabled to determine whether the signaling exists in the data stream. In some embodiments, communication of the particular pattern of the signaling may itself be performed in a trusted communication between a network device (e.g., a network server 114 or the trusted sender) and the network nodes 116 to preserve confidentiality of the particular pattern of the signaling. In yet other embodiments, the signaling may be serialized in a plurality of inter-packet gaps, each existing between multiple packets or frames of data in the data stream, to indicate whether the data stream has been tampered with. In yet other embodiments, the signaling may include an indication of an amount of data (e.g., as represented in bits, bytes, octets, etc.) which is present between inter-packet gaps in the data stream. Such indication may enable a receiving or monitoring device in the system 100 to determine, at least partially based, for example, on the indication of the amount of data, a sequence of the serialized signaling in multiple inter-packet gaps, or both, whether fidelity of the communications during transmission has been maintained or if the data stream has, or has likely, been tampered with.

In some embodiments, each device that originates trusted data in the system 100 may have its own unique pattern of data bits that indicates the trusted nature of the data. For example, each trusted sender may include a unique pattern of data bits in the signaling that indicates the trusted nature of the data originating from that respective trusted sender. In other embodiments, a plurality of devices in the system 100 that originate trusted data may use a same pattern of data bits to indicate the trusted nature of the data. For example, each device in the system 100 that is controlled by a single wireless service provider may include a shared, single pattern of data bits in the signaling that indicates the trusted nature of the data originating from a device controlled by the wireless service provider. The pattern may be, in some embodiments, about 8 bits in length. In such embodiments, about 256 unique patterns may be defined by the 8 bits. The pattern may be, in one exemplary embodiment, a binary sequence of 11000110. In another exemplary embodiment, the pattern may be 01101110. It should be understood that the foregoing patterns are merely exemplary, and any combination of 8 binary data bits may form the pattern. It should be further understood that while an 8-bit pattern is discussed in the foregoing examples, the pattern may be any number of bits smaller than a size of the inter-packet gap and may be combined with other information in the inter-packet gap such as, for example, an identifier or address of a network device for notifications, as discussed above.

The pattern of data bits that indicates the trusted nature of the data may be static or dynamic. For example, the pattern may be a static pattern that remains unchanging or a dynamic pattern that changes with any desired periodicity or aperiodicity. When the pattern is a dynamic pattern, the pattern may change daily, weekly, monthly, or with any other frequency desired by a device in the system 100 which determines the pattern. The pattern may be communicated between the device in the system 100 which determines the pattern and other devices in the system 100 to inform the other devices of the pattern which currently indicates the trusted nature of data. The pattern is communicated, in some embodiments, via encrypted and/or trusted communications to maintain integrity of the pattern. For example, the pattern is communicated via the encrypted and/or trusted communications to prevent unauthorized parties and/or devices from obtaining access to the pattern during transmission of the pattern from the device in the system 100 which determines the pattern to the other devices in the system 100.

Figure 2:
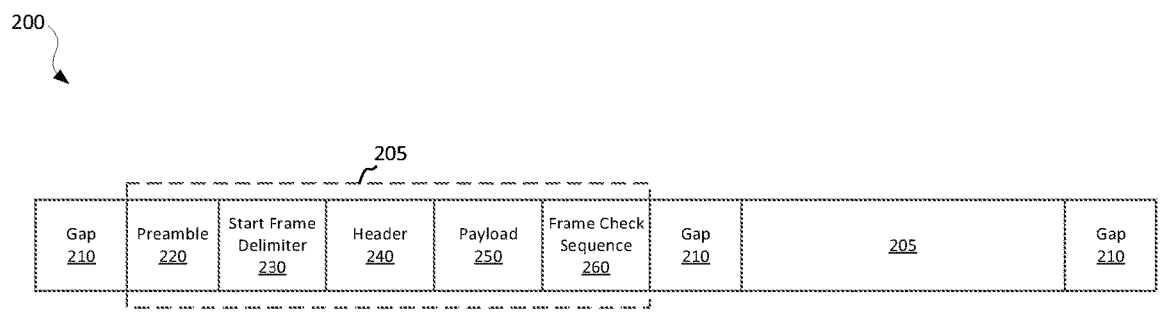
FIG. 2 illustrates an embodiment of an Ethernet packet.

Turning now to FIG. 2, an embodiment of a data stream 200 is disclosed. The data stream 200 is transmitted between any two devices in the system 100 to communicate data. For example, the data stream 200 may be transmitted from a trusted sender to a trusted recipient via one or more network nodes, as discussed above with respect to FIG. 1. The data stream 200, as discussed above with respect to FIG. 1, may include any number of Ethernet packets 205 which may be separated from each other by an inter-packet gap 210. An Ethernet packet 205 includes a preamble 220, a start frame delimiter 230, a header 240, a payload 250, and a frame check sequence 260. The preamble 220 and the start frame delimiter 230 define the beginning of the Ethernet packet 205 and a beginning of an Ethernet frame of the Ethernet packet 205, respectively. The header 240 begins the Ethernet frame of the Ethernet packet 205 and provides information related to the Ethernet packet 205 itself, for example, such as information relating to routing the Ethernet packet 205. For example, in some embodiments the header 240 includes one or more of a destination media access control (MAC) address, a source MAC address, an EtherType field, and, optionally, a tag indicating membership in a virtual local area network (VLAN). The payload 250 includes data being transmitted from a device having the source MAC address to a device having the destination MAC address. In various embodiments, a size of the payload 250 may vary from 42 octets in length to 1500 octets in length, or more. The frame check sequence 260 is a series of bits that facilitates validation of the Ethernet packet 200 to determine whether the Ethernet packet 205 was corrupted during transmission from the device having the source MAC address to the device having the destination MAC address.

Inter-packet gaps 210 bracket the Ethernet packet 205 in the data stream 200. Each of the inter-packet gaps 210 are, in some embodiments, at least 96 bits in length, while in other embodiments the inter-packet gaps 210 may have other lengths as discussed above with respect to FIG. 1. The inter-packet gaps 210, generally, contain idle data which may be any combination of bits in random or non-random (e.g., idle symbol) patterns and which may generally be ignored by a device receiving the idle data. In some embodiments, however, devices receiving data located in one or more of the inter-packet gaps 210 may monitor and/or process at least a portion of the data located in the one or more of the inter-packet gaps 210. For example, when at least some of the inter-packet gaps 210 include signaling that indicates a trusted nature of data contained in the Ethernet packet 205 (e.g., such as in the payload 250) and/or of the data stream 200, a device receiving data located in one or more of the inter-packet gaps 210 (or monitoring the data stream 100 and observing the data located in one or more of the inter-packet gaps 210) may monitor and/or process the data located in the one or more of the inter-packet gaps 210.

The signaling includes, in various embodiments, an indication of trusted nature of the data contained in the Ethernet packet 205, an identification of a notification destination for notifications relating to trusted or untrusted handling of the Ethernet packet 205, and/or any other suitable information, for example, as discussed above with respect to FIG. 1. The signaling may be, in some embodiments, about 8 bits in length. In other embodiments, the signaling may be greater than 8 bits in length and the indication of the trusted nature of the data contained in the Ethernet packet 205 may be about 8 bits in length.

Turning now to FIG. 3, an embodiment of a flowchart of a method 300 for inserting signaling in an inter-packet gap of a data stream is disclosed. The method 300 is performed by a network element (e.g., such as a network server 114 of FIG. 1) when the network element wishes to signal to one or more other devices in a network that communications being transmitted by the network element are trusted communications.

At operation 310, the network element determines an indication of a trusted nature of data. The indication may be a numerical, an alphanumerical value, and/or any other form of unique, or semi-unique, value. In some embodiments, the indication may be about 8 bits in length. The indication may be unique to the network element, unique to a network in which the network element resides, unique to a service provider which controls the network element, etc. The indication may be static (e.g., such that the indication is unchanging, similar in concept to a MAC address) or dynamic (e.g., such that the indication may be changed at any frequency interval to, for example, increase a level of integrity or security of the indication). In some embodiments, determining the indication of the trusted nature of data at operation 310 may comprise receiving the indication from another device in the network, where the other device in the network determined or generated the indication.

At operation 320, the network element writes data including the indication into an inter-packet gap of a data stream. In some embodiments, the data includes only the indication. In other embodiments, the data includes the indication and one or more other information items such as, for example, an identifier or address of a destination for notifications relating to the data stream (e.g., such as notifications of improper receipt and/or improper handling, as discussed above), a size of at least a portion of the data stream, a sequential number for serializing the data written into a plurality of inter-packet gaps of the data stream, and/or other similar information. In some embodiments, the network element writes the data into a single inter-packet gap of the data stream (e.g., a first inter-packet gap existing in the data stream or an inter-packet gap immediately preceding an Ethernet frame which begins a trusted communication), while in other embodiments the network element writes the data into a plurality of inter-packet gaps in the data stream. When the network element writes the data into a plurality of inter-packet gaps in the data stream, the particular inter-packet gaps may be sequential or non-sequential and the data written to each of the inter-packet gaps may be the same, partially the same (e.g., having a same indication and identifier of a destination for notifications but other information which may not be the same), or different information from a preceding and/or a subsequent inter-packet gap. In some embodiments, optionally, at least some of the data may be encrypted. At operation 330, the network element transmits the data stream in the network.

Optionally, the method 300 may further include operation 340 at which the network element receives a notice of improper receipt and/or improper handling of trusted data (e.g., the data stream and/or at least one Ethernet frame of the data stream). The notice is received, for example, when an identifier or address of the network element is included in the data written into the inter-packet gap of the data stream at operation 320 for notifications relating to the data stream. In response to the notification, at operation 350, in some embodiments, the network element may retransmit the data stream via a same, or a different, path through the network. In yet other embodiments, in response to the notification, the network element may transmit at least one trusted Ethernet frame through the network, where the trusted Ethernet frame enables the network element to monitor a path of the trusted Ethernet frame (e.g., by including instructions for a device receiving the trusted Ethernet frame in the network to report back to the network element). The network element monitoring the path of the trusted Ethernet frame, in some embodiments, enables the network element to determine a device or location in the network at which the trusted Ethernet frame may first be improperly received and/or improperly handled (e.g., received and/or handled outside of trust). Subsequently, the network device may retransmit the data stream through the network with one or more instructions included within the data stream (e.g., in a header of the data stream) for avoiding the device or location in the network at which the trusted Ethernet frame was first improperly received and/or improperly handled.

Turning now to FIG. 4, an embodiment of a flowchart of a method 400 for monitoring an inter-packet gap of a data stream for signaling indicating a trusted nature of the data stream is disclosed. The method 400 is performed by a network element (e.g., such as a network node 116 of FIG. 1) when the network element wishes to monitor data streams in the network for presence of signaling indicating a trusted nature of the data stream. The data stream is, in some embodiments, being transmitted through the network in a broadcast manner at a data link layer of the network.

At operation 410, the network element monitors a data link layer of the network for signaling indicating a trusted nature of a data stream being transmitted through the network. In some embodiments, the data stream is being transmitted to the network element (e.g., the network element is identified in a destination field of the data stream, such as the destination MAC address field of a header in the data stream). In other embodiments, the data stream is traversing the network element (e.g., being transported through the network at least partially via the network element) in route to a destination. In yet other embodiments, the data stream is neither being transmitted to, nor traversing, the network element. For example, the network element may be configured to monitor, via the client, data streams in a network existing at a data link layer regardless of the source, destination, and/or route through the network to determine whether the data streams are being properly handled and routed when the data streams are trusted data streams and/or the data streams contain at least some trusted data (e.g., such as at least one trusted Ethernet frame).

The network element, in some embodiments, executes a client, application, or other form of digital logic and/or executable instructions operating at a network layer higher than the data link layer (e.g., at an application layer) to monitor the data stream at the data link layer. Monitoring the data stream at the data link layer may enable the client to examine an inter-packet gap of the data stream to determine whether signaling indicating a trusted nature of the data stream is present. The inter-packet gap, or data contained within the inter-packet gap, in at least some embodiments, may be inaccessible and/or absent at network layers higher than the data link layer, such as, for example, when the data stream is processed at a network layer, transport layer, or other higher layers of the network. Monitoring the data stream at the data link layer also enables the client to examine the inter-packet gap of the data stream to determine whether the signaling indicating the trusted nature of the data stream is present without accessing an Ethernet frame of the data frame (e.g., parsing, decrypting, sniffing, and/or otherwise processing the data frame), thereby preserving a trusted nature of the Ethernet frame when the Ethernet frame is a trusted Ethernet frame.

At operation 420, the network element determines whether the data stream is being properly handled in the network. The network element determines whether the data stream is being properly handled in the network, for example, by determining whether the data stream is being transmitted via trusted components in the network and/or via trusted communication links (e.g., encrypted and/or end-to-end trusted communication links) in the network.

At operation 430, when the network element determines that a data stream has been improperly handled, the network element executes one or more actions in response to the determination. For example, the network element may transmit a notification to one or more other devices in the network. The one or more devices may be, for example, a device in the network from which the data stream originated (e.g., the sender indicated in a header of an Ethernet frame of the data stream), a first upstream device in the network from which the network element received the data stream, a notification destination preprogrammed in the network element, a notification destination indicated in the data stream (e.g., such as a notification destination address included in the inter-packet gap of the data stream), or any other device in the network which may be designated as a destination for notification of improper receipt and/or handling of the data stream with at least one trusted Ethernet frame.

Alternatively, or additionally, in some embodiments the network element may reroute the data stream when the network element determines that the data stream is being improperly handled in the network. The network element may reroute the data stream, for example, by replacing a destination address in a header in the data stream with a destination address of another device in the network. The other device in the network may be, for example a predetermined destination for rerouting of data streams containing trusted data found being improperly handled in the network. In other embodiments, the network element may reroute the data stream, for example, by routing the data stream through a trusted portion of the network.

Alternatively, or additionally, in some embodiments the network element may have improperly received the data stream containing trusted data. For example, the network element may have received the data stream via at least some untrusted components and/or communication links. In such embodiments, the network element may drop or otherwise discard the data stream such that the data stream is no longer processed in the network in an untrusted manner. In other embodiments, the network element may transmit the data stream to a downstream device in the network via trusted components and/or communication links despite the data stream being improperly received via at least some untrusted components and/or communication links. In yet other embodiments, the network element may return the data stream to the device in the network from which the data stream originated.

Figure 5:
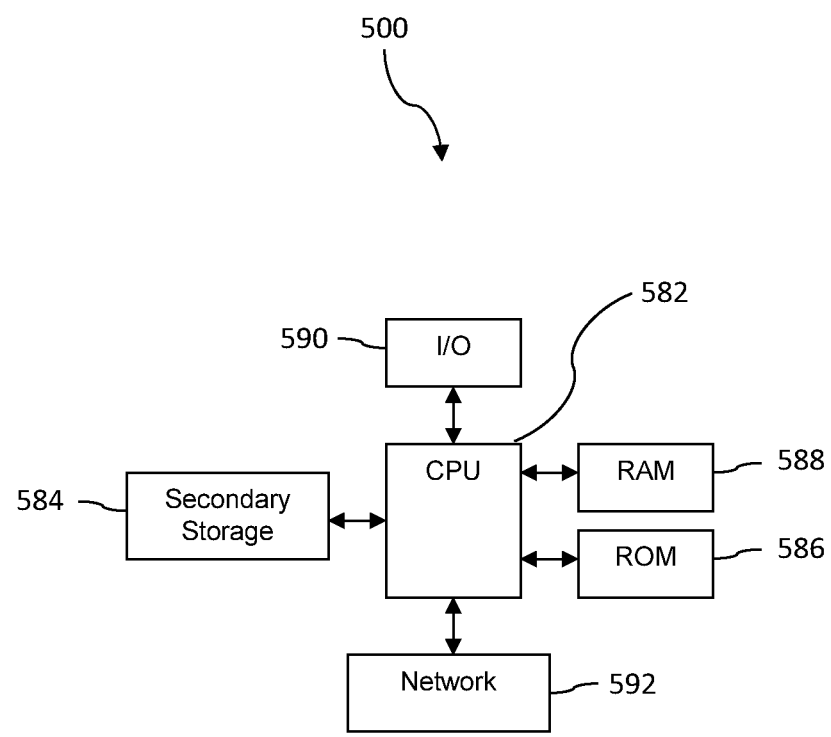
FIG. 5 illustrates an exemplary computer system suitable for implementing the several embodiments of the disclosure.

FIG. 5 illustrates a computer system 500 suitable for implementing one or more embodiments disclosed herein. In some embodiments, the computer system 500 may be referred to as a piece of computing hardware, a piece of network equipment, a network device, a gateway, a router, and/or a network node. The computer system 500 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 500, at least one of the CPU 582, the RAM 588, and the ROM 586 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 582 may execute a computer program or application. For example, the CPU 582 may execute software or firmware stored in the ROM 586 or stored in the RAM 588. In some cases, on boot and/or when the application is initiated, the CPU 582 may copy the application or portions of the application from the secondary storage 584 to the RAM 588 or to memory space within the CPU 582 itself, and the CPU 582 may then execute instructions that the application is comprised of. In some cases, the CPU 582 may copy the application or portions of the application from memory accessed via the network connectivity devices 592 or via the I/O devices 590 to the RAM 588 or to memory space within the CPU 582, and the CPU 582 may then execute instructions that the application is comprised of. During execution, an application may load instructions into the CPU 582, for example load some of the instructions of the application into a cache of the CPU 582. In some contexts, an application that is executed may be said to configure the CPU 582 to do something, e.g., to configure the CPU 582 to perform the function or functions promoted by the subject application. When the CPU 582 is configured in this way by the application, the CPU 582 becomes a specific purpose computer or a specific purpose machine.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), flash drive, ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 584, to the ROM 586, to the RAM 588, and/or to other non-volatile memory and volatile memory of the computer system 500. The processor 582 may process the executable instructions and/or data structures in part by directly accessing the computer program product, for example by reading from a CD-ROM disk inserted into a disk drive peripheral of the computer system 500. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 500.

In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An apparatus, comprising:
  a network communication interface to communicatively couple the apparatus to a network;
  a processor coupled to the network communication interface; and
  a memory coupled to the processor and configured to execute instructions to cause the apparatus to:
    determine an indicator of a trusted nature of data for transmission through the network, the indicator including a plurality of serialized portions;
    write the data to a frame of a data stream;
    write the indicator to a plurality of inter-packet gaps of the data stream, where a first of the plurality of serialized portions of the indicator is written to a first inter-packet gap of the plurality of inter-packet gaps and a second of the plurality of serialized portions of the indicator is written to a second inter-packet gap of the plurality of inter-packet gaps to indicate fidelity of the data stream via an order of sequence of the indicator in the data stream; and
    transmit the data stream to the network via the network communication interface.

2. The apparatus of claim 1, wherein the indicator is unique to the apparatus.

3. The apparatus of claim 1, wherein the indicator is unique to a communications service provider controlling the apparatus.

4. The apparatus of claim 1, wherein executing the instructions further causes the apparatus to write a network identifier of a notification destination for transmission of notification of improper handling of the data stream to the inter-packet gap of the data stream.

5. The apparatus of claim 1, wherein the network communication interface, the processor, and the memory are executing at least partially in a trusted security zone.

6. The apparatus of claim 1, wherein executing the instructions further causes the apparatus to write the indicator to a second inter-packet gap of the data stream, wherein the second inter-packet gap of the data stream exists between the frame of the data stream and a second frame of the data stream.

7. The apparatus of claim 1, wherein after receiving a notification of improper handling of the data stream, executing the instructions further causes the apparatus to transmit a second data stream through the network to determine a first location in the network at which the improper handling of the data stream occurs.

8. An apparatus, comprising:
  a network communication interface to communicatively couple the apparatus to a network;
  a processor coupled to the network communication interface;
  a memory coupled to the processor; and
  a trusted data monitoring application stored in the memory that when executed, causes the processor to:
    monitor the network for existence of a data stream containing an indicator of a trusted nature of data contained in the data stream, the indicator including a plurality of serialized portions;
    determine whether the data stream is being properly handled in the network when the data stream contains the indicator of the trusted nature of data contained in the data stream, the determination made at least according to a determination that the plurality of serialized portions occur in contiguous serial order in a plurality of inter-packet gaps of the data stream; and
    execute at least one action in the network in response to the data stream not being properly handled in the network.

9. The apparatus of claim 8, wherein the processor monitors the network at a layer of the network lower than the network layer.

10. The apparatus of claim 8, wherein monitoring the network for existence of the data stream containing the indicator of the trusted nature of data contained in the data stream comprising monitoring an inter-packet gap of the data stream for existence of the indicator.

11. The apparatus of claim 8, wherein executing the at least one action in the network in response to the data stream not being properly handled in the network comprises transmitting a notification to a device in the network to inform the device that the data stream is not being properly handled in the network.

12. The apparatus of claim 11, wherein the processor transmits the notification to the device in the network according to a notification address of the device in the network, and wherein the notification address is contained in an inter-packet gap of the data stream.

13. The apparatus of claim 8, wherein executing the at least one action in the network in response to the data stream not being properly handled in the network comprises rerouting the data stream from a first destination to a second destination, and wherein the second destination is a network device designated to receive data streams that are determined as not being properly handled in the network.

14. The apparatus of claim 8, wherein executing the at least one action in the network in response to the data stream not being properly handled in the network comprises rerouting the data stream in the network from an at least partially untrusted portion of the network to a trusted portion of the network.

15. A method executed in a communications network, comprising:
    writing, by a first network element, into a plurality of inter-packet gaps of a data stream, an indication of a trusted nature of data included in a frame of the data stream, wherein the indicator includes a plurality of serialized portions having a first of the plurality of serialized portions of the indicator written to a first inter-packet gap of the plurality of inter-packet gaps and a second of the plurality of serialized portions of the indicator written to a second inter-packet gap of the plurality of inter-packet gaps to indicate fidelity of the data stream via an order of sequence of the indicator in the data stream;
    transmitting, by the first network element, the data stream through the communications network;
    monitoring, by a second network element, the communications network at a data link layer for existence of the indication of the trusted nature of data in the inter-packet gap of the data stream;
    determining, by the second network element, that the data stream is being improperly handled in the communications network; and
    transmitting, by the second network element, a notification of improper handling of the data stream in the communications network to a notification destination.

16. The method of claim 15, further comprising writing, by the first network element, into the inter-packet gap of the data stream, a notification address of the notification destination in the communications network for transmission of the notification of improper handling of the data stream in the communications network.

17. The method of claim 15, wherein the second network element monitors the communications network at the data link layer by executing a monitoring client at a network layer higher than the data link layer.

18. The method of claim 15, wherein the first network element operates in a trusted security zone while transmitting the data stream through the network.

19. The method of claim 18, further comprising transmitting, by the first network element, a test data stream through the communications network to determine a first location in the communications network at which the improper handling of the data stream occurs.

20. The method of claim 19, further comprising re-transmitting, by the first network element, the data stream through the communications network via a route through the communications network configured to circumvent the first location in the communications network at which the improper handling of the data stream occurs.

* * * * *